United States Patent
Zhou

(10) Patent No.: US 7,362,857 B2
(45) Date of Patent: *Apr. 22, 2008

(54) SUBSCRIBER LINE INTERFACE CIRCUITRY TRANSCEIVER

(75) Inventor: Yan Zhou, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 785 days.

This patent is subject to a terminal disclaimer.

(21) Appl. No.: 10/750,420

(22) Filed: Dec. 31, 2003

(65) Prior Publication Data

US 2005/0141536 A1 Jun. 30, 2005

(51) Int. Cl.
  *H04M 1/00* (2006.01)
  *H04M 9/00* (2006.01)

(52) U.S. Cl. .................................. 379/399.01
(58) Field of Classification Search ............. None
  See application file for complete search history.

(56) References Cited

U.S. PATENT DOCUMENTS

| | | | |
|---|---|---|---|
| 4,866,767 A | 9/1989 | Tanimoto et al. | |
| 5,329,588 A | 7/1994 | Willocx et al. | |
| 5,452,345 A | 9/1995 | Zhou et al. | |
| 5,835,533 A * | 11/1998 | Booth et al. | 375/235 |
| 5,930,340 A | 7/1999 | Bell | |
| 5,999,619 A | 12/1999 | Bingel | |
| 6,226,331 B1 * | 5/2001 | Gambuzza | 375/258 |
| 6,295,343 B1 | 9/2001 | Hjartarson et al. | |
| 6,424,636 B1 | 7/2002 | Seaholtz et al. | |
| 6,674,845 B2 | 1/2004 | Ayoub et al. | |
| 6,735,302 B1 | 5/2004 | Caine et al. | |
| 6,782,096 B1 | 8/2004 | Bremer et al. | |
| 6,895,040 B2 | 5/2005 | Zhou | |
| 6,944,213 B2 | 9/2005 | Lee | |
| 6,990,191 B2 * | 1/2006 | Anderson et al. | 379/398 |
| 2002/0114444 A1 | 8/2002 | Anderson et al. | |
| 2004/0124996 A1 | 7/2004 | Andersen | |
| 2004/0257114 A1 | 12/2004 | Hanneberg et al. | |
| 2005/0147231 A1 | 7/2005 | Zhou | |
| 2005/0147232 A1 | 7/2005 | Zhou | |
| 2005/0147234 A1 | 7/2005 | Zhou | |
| 2005/0152533 A1 | 7/2005 | Zhou | |
| 2005/0220291 A1 * | 10/2005 | Hein et al. | 379/399.01 |

OTHER PUBLICATIONS

Infineon Technologies, "Product Brief: GEMINAX Global Enhanced Multiport Integrated ADSL Transceiver", Infineon Technologies AG, Germany (2001).

(Continued)

*Primary Examiner*—Ramnandan Singh
(74) *Attorney, Agent, or Firm*—Davis & Associates; William D. Davis

(57) ABSTRACT

A subscriber line interface circuit apparatus includes a first driver for driving a downstream data signal in a non-voiceband range onto a subscriber line and a second driver for driving a downstream voice signal in a voiceband range onto the subscriber line. The apparatus includes receiver circuitry coupled to provide an upstream data signal and an upstream voice signal from an upstream signal carried by the subscriber line. The first driver and receiver circuitry reside on a same first integrated circuit die.

23 Claims, 12 Drawing Sheets

OTHER PUBLICATIONS

Infineon Technologies, "Product Brief: GEMINAX ADSL Transceiver Chipset", Infineon Technologies AG, Germany (2001).

Infineon Technologies, "Press Release: Infineon Technologies Introduces the IVAX Family—the First Chipset to Integrate Voice and Fullrate ADSL on a Single Line Card", Infineon Technologies AG, Germany (May 15, 2001).

Pessl, Peter, et al. "A four channel Integrated Voice and ADSL Full-Rate Analog Front End", 27th European Solid-State Circuits Conference, Villach, Austria, Sep. 18-20, 2001.

* cited by examiner

SUBSCRIBER LINE INTERFACE CIRCUITRY TRANSCEIVER

FIELD OF THE INVENTION

This invention relates to the field of telecommunications. In particular, this invention is drawn to subscriber line interface circuitry.

BACKGROUND

The plain old telephone system (POTS) was initially architected to carry voice data in analog form from one subscriber to another via configurable switches. Although the telephone network evolved to using a digital transport network (i.e., the Public Switched Telephone Network (PSTN)), communication on the subscriber line connecting subscribers to the central office that serves as the entry point to the PSTN is analog. The "last mile" between the subscriber and the central office was architected for analog communications in the voiceband frequency range.

Although modems were developed to enable communicating digital data using the same analog channel used to carry analog voice data, the digital data rates between the subscriber and central office were relatively low due to the constraints of operating exclusively within the voiceband region of the spectrum. Numerous communication protocol standards have since developed to enable using the POTS infrastructure for communicating digital data at higher data rates by utilizing communication bandwidth beyond the voiceband. For example, digital subscriber line (xDSL) services utilize communication bandwidth beyond and exclusive to the voiceband. As a result, xDSL services may co-exist with voiceband communications. Co-location of access to digital networks other than the PSTN at the central office enables leveraging the POTS infrastructure investment in the subscriber line.

The central offices may be retrofitted to permit sharing the subscriber line between multiple services such as voice and digital services. Typically this is accomplished by adding digital service specific linecards and a discrete component splitter for each subscriber line so that the subscriber line can be communicatively coupled to both the existing POTS linecard and the added digital service linecard. The discrete component splitters are relatively expensive and represent a significant cost for a large number of subscriber lines.

This approach permits leveraging the existing infrastructure at the central office including the existing POTS linecards through the addition of the splitters and digital services linecards rather than the replacement of equipment. However, the additional equipment consumes valuable space within the central office that might otherwise be used for POTS linecards and additional subscriber lines. Thus this approach may not be particularly desirable for new facilities when preservation of existing capital equipment is not an issue.

SUMMARY

In one embodiment, a subscriber line interface circuit apparatus includes driver circuitry for combining and driving a downstream voice signal and a downstream data signal onto a subscriber line. Receiver circuitry receives and separates an upstream signal from the subscriber line into an upstream voice signal and an upstream data signal. The driver and receiver circuitry reside on a common integrated circuit die.

Another subscriber line interface circuit apparatus includes driver circuitry for combining and driving a downstream voice signal, a metering signal and a downstream data signal onto a subscriber line. The apparatus includes receiver circuitry for receiving and separating an upstream signal from the subscriber line into an upstream voice signal and an upstream data signal. The driver and receiver circuitry reside on a common integrated circuit die.

In one embodiment, a subscriber line interface circuit apparatus includes first driver circuitry for driving a downstream data signal onto a subscriber line and second driver circuitry for combining and driving a metering signal and a downstream voice signal onto the subscriber line. The apparatus includes receiver circuitry for receiving and separating an upstream signal from the subscriber line into an upstream voice signal and an upstream data signal. The receiver circuitry and the first driver circuitry for driving the downstream data signal reside on the same first integrated circuit die exclusive of the second driver circuitry.

In one embodiment, a subscriber line interface circuit apparatus includes first driver circuitry for combining and driving a downstream data signal and a metering signal onto a subscriber line. The apparatus includes second driver circuitry for driving a downstream voice signal onto the subscriber line. The apparatus further includes receiver circuitry for receiving and separating an upstream signal from the subscriber line into an upstream voice signal and an upstream data signal. The receiver circuitry and the first driver circuitry for driving the downstream data signal reside on the same first integrated circuit die exclusive of the second driver circuitry.

In one embodiment, a subscriber line driver apparatus includes an impedance bridge coupled to a subscriber line. A first pair of current drivers is coupled to the impedance bridge for driving a voice signal in a first frequency range onto the subscriber line. A second pair of current drivers is coupled to the impedance bridge for driving a data signal in a second frequency range onto the subscriber line. The impedance bridge couples the second pair of current drivers to the subscriber line across an impedance of Z1+Z2 within the second frequency range.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
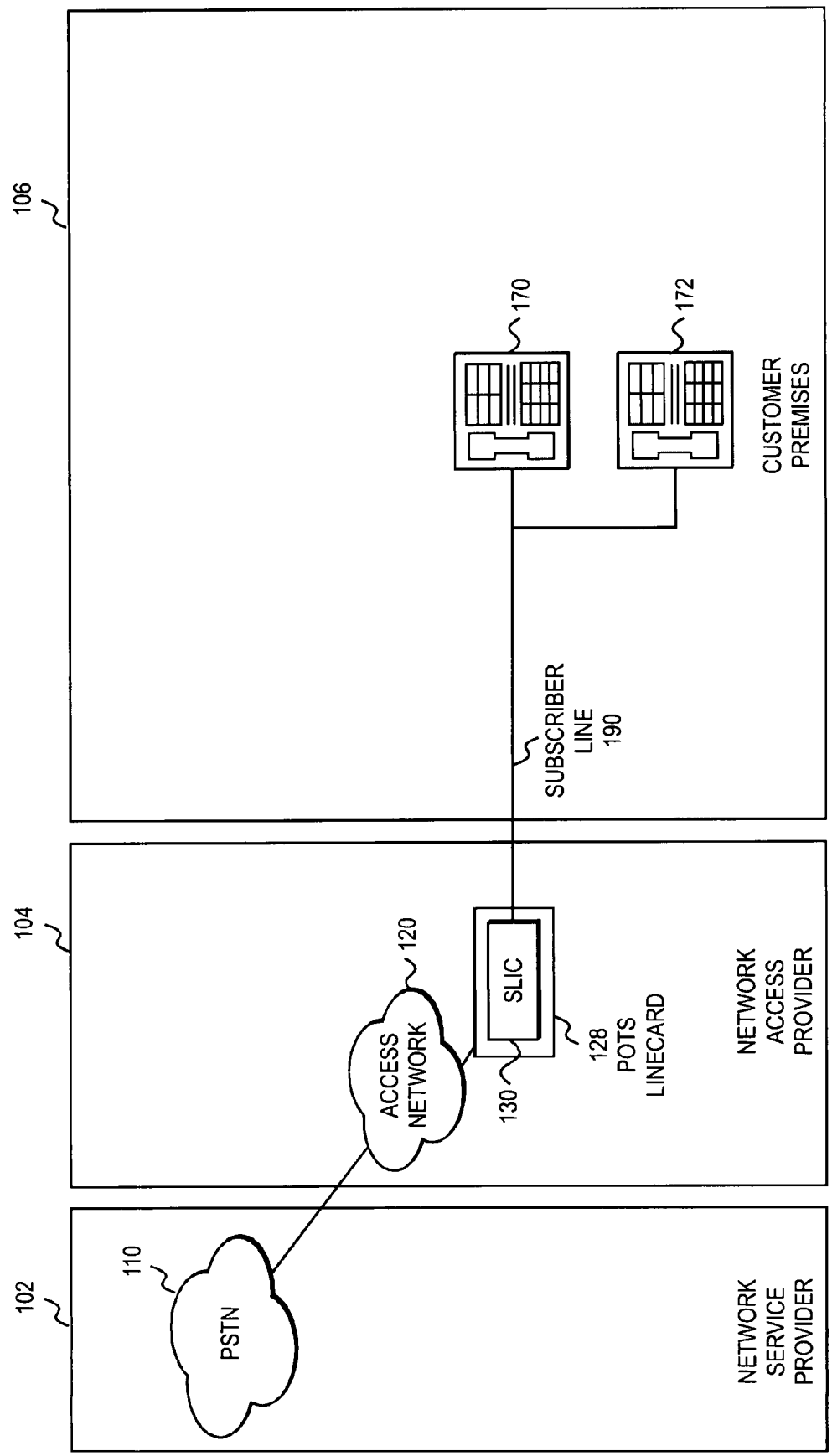
FIG. 1 illustrates one embodiment of a plain old telephone system (POTS) communication architecture.

FIG. 1 illustrates one embodiment of a prior art communications network model supporting voiceband communications associated with plain old telephone services (POTS) telephone system. The network model is divided into three physical domains: network service provider(s) 102, network access providers 104, and customer premises 106.

The network service providers (NSP) may have networks that span large geographic areas. Typically, however, the customer premises (CP) must be located within a specified distance of the network access provider (NAP) as a result of electrical specifications on the subscriber line 190. Thus network access providers typically have a number of central offices (CO) that support customers within a specified radius. Local exchange carriers (LEC) and competitive local exchange carriers (CLEC) are examples of network access providers.

In one embodiment, the network access provider is a telephone company. Subscriber equipment (i.e., customer premises equipment such as telephones 170, 172) is connected to a central office (CO) of the network access provider 104 via a subscriber line 190. For POTS systems, the subscriber line includes a tip line and a ring line that are typically implemented as an unshielded twisted copper wire pair.

The central office has numerous POTS linecards 128 for supporting multiple subscriber lines. Each linecard has at least one subscriber line interface circuit (SLIC) 130 that serves as an interface between a digital switching access network 120 of a local telephone company central office and the subscriber equipment 170, 172. In some embodiments, each linecard has a plurality of SLICs. The access network provides the SLIC and associated subscriber with access to the PSTN 110 for bidirectional communication with other subscribers similarly coupled to the PSTN.

Figure 10:
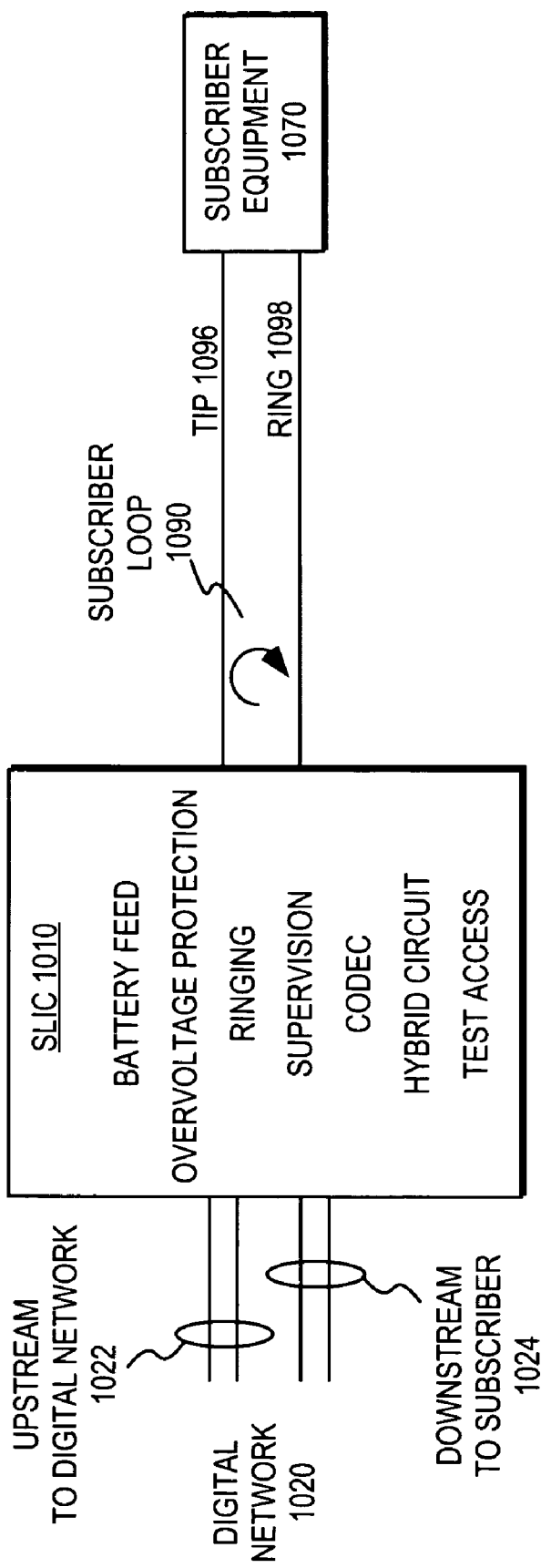
FIG. 10 illustrates one embodiment of a SLIC.

FIG. 10 illustrates one embodiment of a SLIC 1010 coupled to subscriber equipment 1070 by a subscriber line comprised of tip line 1096 and ring line 1098. The tip line 1096, subscriber equipment 1070, and ring line 1098 form a subscriber loop 1090. The POTS standards establish the electrical specifications and communication protocols for voiceband communications carried by the subscriber line.

The SLIC receives downstream digital voiceband data from digital network 1020 (e.g., the PSTN) on a downstream data path 1024 for conversion and communication to the subscriber equipment 1070. The SLIC receives upstream analog voiceband data from subscriber equipment 1070 for conversion and communication to the digital network 1020 on upstream data path 1022.

The SLIC is expected to perform a number of functions often collectively referred to as the BORSCHT requirements. BORSCHT is an acronym for "battery feed," "overvoltage protection," "ring," "supervision," "codec," "hybrid," and "test" (e.g., loop diagnostics).

Referring to FIG. 1, the SLIC provides power to the subscriber equipment 170, 172 using the battery feed function. The overvoltage protection function serves to protect the central office circuitry against voltage transients that may occur on the subscriber line 190. The ringing function enables the SLIC to signal the subscriber equipment 170, 172 (e.g., ringing a telephone).

The supervision function enables the SLIC to detect subscriber equipment service requests such as when the caller goes "off-hook". The supervision function is also used to supervise calls in progress and to detect dialing input signals.

The hybrid function provides a conversion from two-wire signaling to four-wire signaling. The transmit path (downstream to subscriber) and receive path (upstream from subscriber) share the same physical lines of the subscriber loop. Given that the upstream signal from the subscriber and the downstream signal from the SLIC share the same subscriber line for communication, the hybrid function typically performs some form of cancellation to remove the downstream signal from the sensed subscriber line in order to distinguish the upstream signal from other signals on the subscriber line.

The SLIC includes a codec to convert the upstream analog voiceband data signal into serial digital codes suitable for transmission by the digital switching network 110. In one embodiment, pulse code modulation is used to encode the voiceband data. The codec also converts the digital downstream voiceband data from serial digital codes to analog signals suitable for downstream transmission on the subscriber line to the subscriber equipment. The SLIC also typically provides a means to test for faults that may exist in the subscriber loop or within the SLIC itself.

Historically, the network access providers served to connect customers or subscribers to the PSTN for voiceband communications (communications having an analog bandwidth of approximately 4 kHz or less). Although the PSTN is digital in nature, the connection (subscriber line 190) between the customer premises 106 and the network access provider 104 is analog.

The subscriber line may be provisioned for additional services by using communication bandwidth beyond the voiceband. Thus, for example, digital subscriber line services may simultaneously co-exist with voiceband communications by using communication bandwidth other than the voiceband. The choice of frequency ranges and line codes for these additional services is the subject of various standards. The International Telecommunication Union (ITU), for example, has set forth a series of recommendations for subscriber line data transmission. These recommendations are directed towards communications using the voiceband portion of the communications spectrum ("V.x" recommendations) as well as communications utilizing frequency spectrum other than the voiceband portion (e.g., "xDSL" recommendations). Various examples of line code standards include quadrature amplitude and phase modulation, discrete multi-tone modulation, carrierless amplitude phase modulation, and two binary one quaternary (2B1Q).

Asymmetric digital subscriber line (ADSL) communications represent one variant of xDSL communications. Exemplary ADSL specifications are set forth in "Rec. G.992.1 (06/99)—Asymmetric digital subscriber line (ADSL) transceivers" (also referred to as full rate ADSL), and "Rec. G.992.2 (06/99)—Splitterless asymmetric digital subscriber line (ADSL) transceivers" (also referred to as G.LITE).

Figure 2:
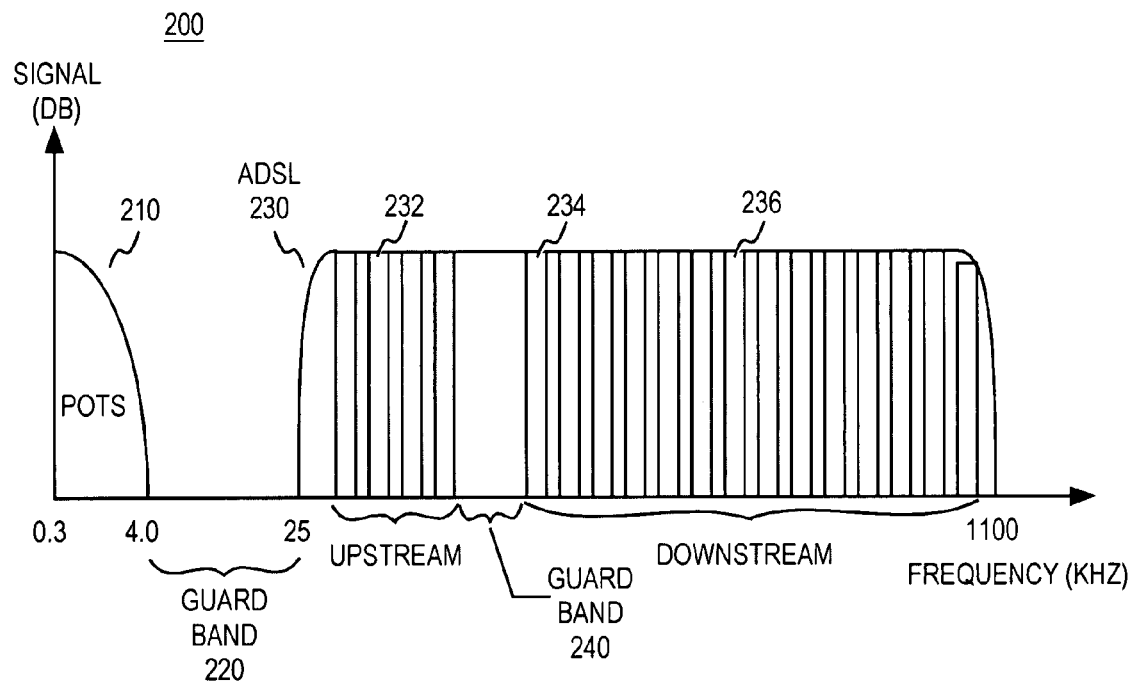
FIG. 2 illustrates one embodiment of a communication spectrum allocation for a subscriber line.

FIG. 2 illustrates one embodiment of communication spectrum allocation for a subscriber line. Chart 200 compares the portions of the analog channel for voiceband applications (POTS 210) as well as digital services (e.g., ADSL 230). POTS communications typically use the voiceband range of 300-4000 Hz. One xDSL variant uses frequencies beyond the voiceband in the range of approximately 25-1100 kHz as indicated. A guard band 220 separates the POTS and ADSL ranges.

There are multiple line coding variations for xDSL. Carrierless Amplitude Phase (CAP) modulation and Discrete Multi-Tone (DMT) modulation both use the fundamental techniques of quadrature amplitude modulation (QAM). CAP is a single carrier protocol where the carrier is suppressed before transmission and reconstructed at the receiving end. DMT is a multicarrier protocol. FIG. 2 illustrates DMT line coding.

DMT modulation has been established as a standard line code for ADSL communication. The available ADSL bandwidth is divided into 256 sub-channels. Each sub-channel 234 is associated with a carrier. The carriers (also referred to as tones) are spaced 4.3125 KHz apart. Each sub-channel is modulated using quadrature amplitude modulation (QAM) and can carry 0-15 bits/Hz. The actual number of bits is allocated depending upon line conditions. Thus individual sub-channels may be carrying different numbers of bits/Hz. Some sub-channels 236 might not be used at all.

ADSL uses some sub-channels 234 for downstream communication and other sub-channels 232 for upstream communication. The upstream and downstream sub-channels may be separated by another guard band 240. ADSL is named for the asymmetry in bandwidth allocated to upstream compared to the bandwidth allocated to downstream communication.

During initialization the signal-to-noise ratio of each DMT sub-channel is measured to determine an appropriate data rate assignment. Generally, greater data rates (i.e., more bits/Hz) are assigned to the lower sub-channels because signals are attenuated more at higher frequencies. DMT implementations may also incorporate rate adaption to monitor the line conditions and dynamically change the data rate for sub-channels.

xDSL can be provisioned using the same subscriber line as that used for standard POTS communications thus leveraging existing infrastructure. The availability of xDSL technology permits delivery of additional services to the subscriber.

Figure 3:
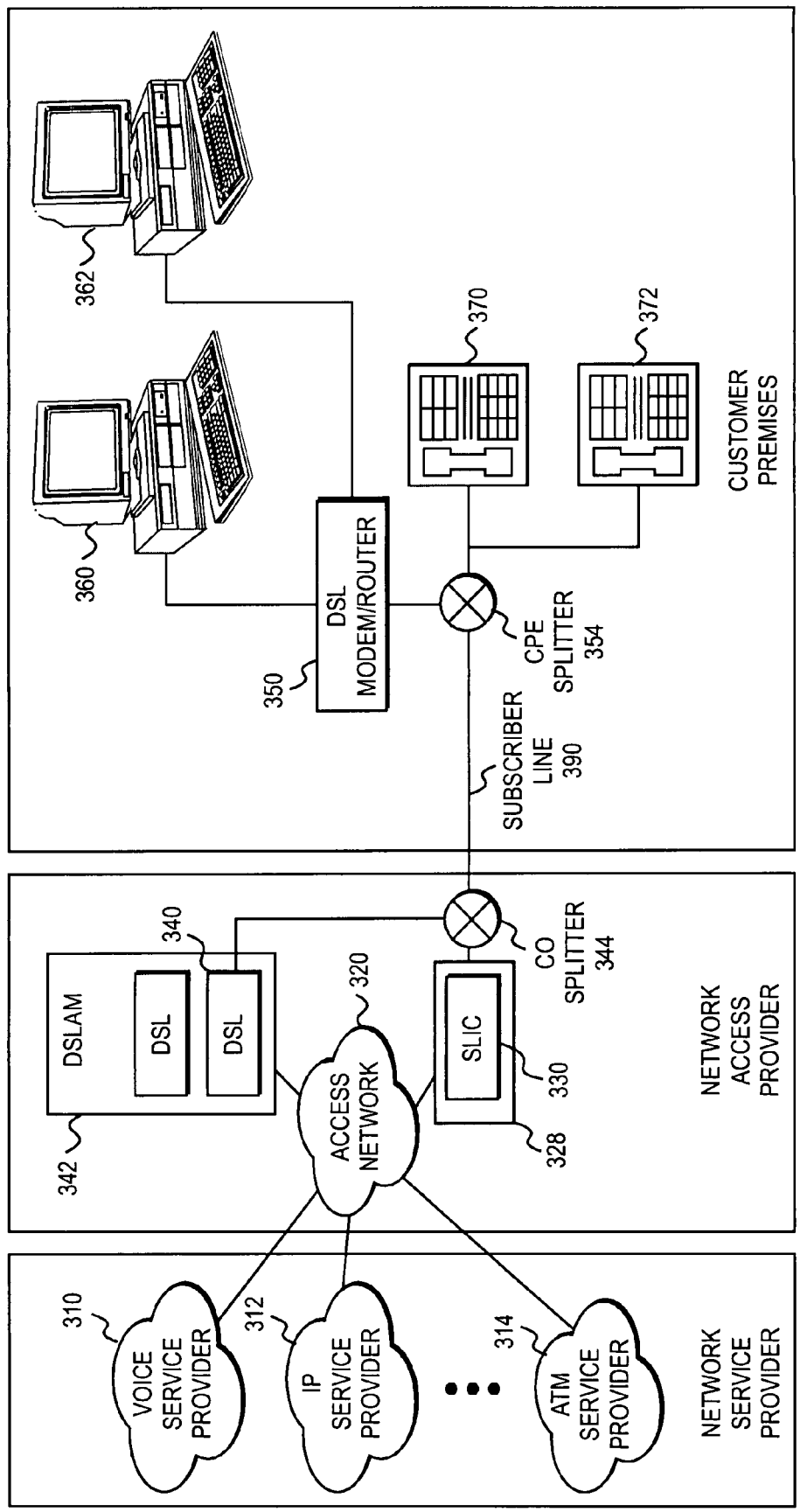
FIG. 3 illustrates one embodiment of prior art interface circuitry for supporting digital and voice data on the same subscriber line.

FIG. 3 illustrates an embodiment of a communications network model supporting voice and digital services (e.g., xDSL) on a common subscriber line 390. Various digital services may utilize different encoding algorithms (e.g., two binary one quaternary (2B1Q)). The POTS subscriber equipment such as telephones 370, 372 are connected to a POTS SLIC 330 residing on a POTS linecard 328 via subscriber line 390. The NAP access network 320 couples the POTS linecard to a voice service provider network 310 such as the PSTN.

A digital subscriber line access multiplexer (DSLAM) 342 has a plurality of DSL linecards 340. The access network 320 enables communication with digital network service providers such as Internet protocol (IP) service providers 312 and asynchronous transfer mode (ATM) service providers 314. A DSLAM linecard provides a connection from one of the digital networks via access network 320 to the subscriber line 390 through the use of a central office splitter 344.

The splitter 344 serves to route the appropriate portion of the analog channel of the subscriber line 390 to one of the DSL linecard 340 and the POTS linecard 328. In particular, the splitter filters out the digital portion of the subscriber line communications for the POTS linecard 328. The splitter filters out the voiceband communications for the DSL linecard 340. The splitter also protects the DSL linecard from the large transients and control signals associated with the POTS communications on the subscriber line.

The CO splitter thus effectively splits upstream communications from the subscriber equipment into at least two spectral ranges: voiceband and non-voiceband. The upstream voiceband range is provided to the POTS linecard and the upstream non-voiceband range is provided to the DSL linecard. The splitter couples the distinctly originating downstream voiceband and downstream non-voiceband communications to a common physical subscriber line 390.

A customer premises equipment splitter 354 may also be required at the customer premises for the POTS subscriber equipment 370, 372. The CPE splitter 354 passes only the voiceband portion of the subscriber line communications to the POTS subscriber equipment.

In one embodiment, the CPE splitter provides the DSL communications to a DSL modem 350 that serves as a communications interface for digital subscriber equipment such as computers 360, 362. In one embodiment, the DSL modem includes router functionality.

The DSL service overlays the existing POTS service on the same subscriber line. This solution avoids the capital costs of placing dedicated digital subscriber lines and permits utilizing existing POTS linecards. This approach is undesirable, however, for new installations (i.e., in the absence of pre-existing POTS linecard capital costs) because of the significant additional space required for the DSLAM and DSL linecards. Moreover, although some xDSL variants permit the elimination of the CPE splitter with the tradeoff of lower digital communication rates, the approach of FIG. 3 still require a costly, space consuming discrete component central office splitter 344.

Figure 4A:
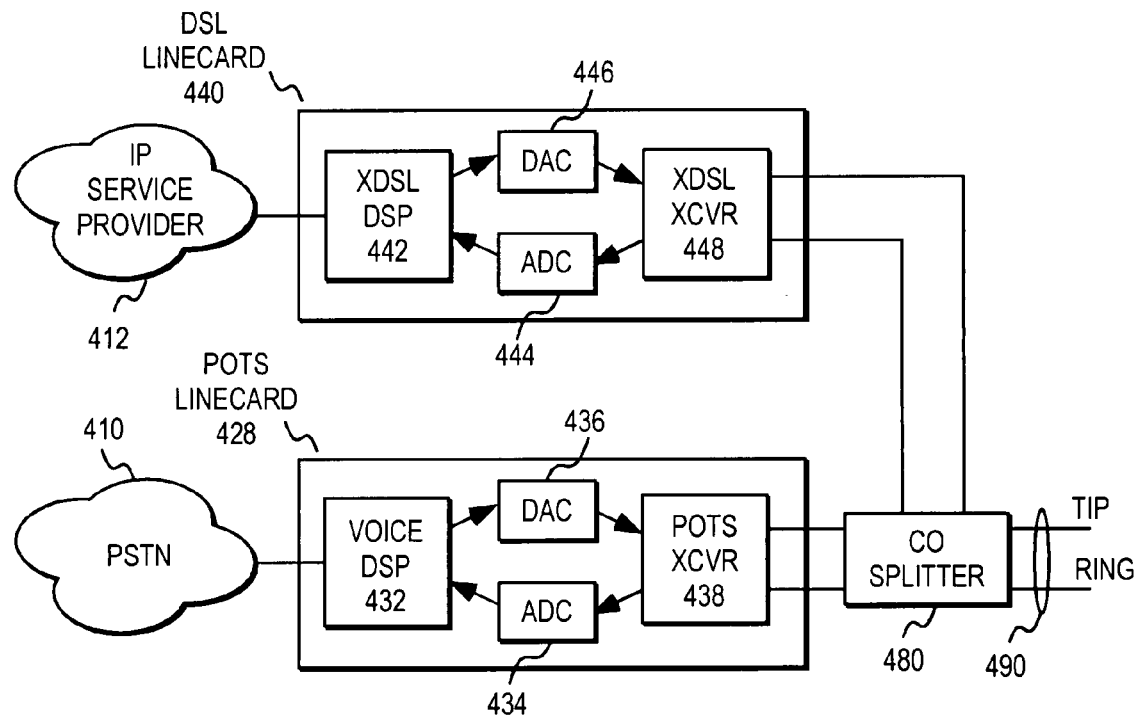
FIG. 4A illustrates separate DSL and POTS linecards coupled to a subscriber line.
Figure 4B:
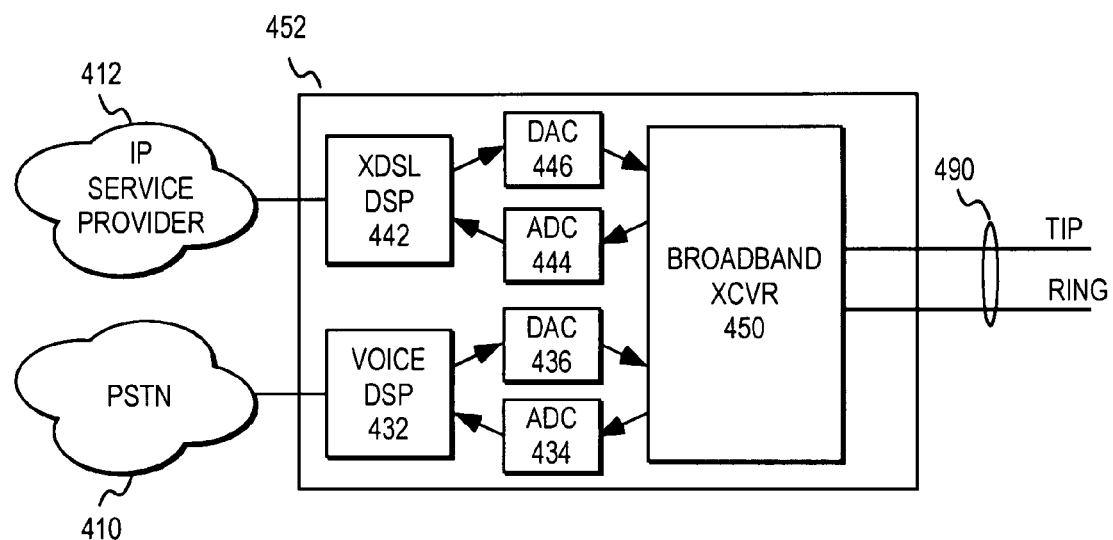
FIG. 4B illustrates one embodiment of an integrated POTS and DSL linecard.

A number of integrated voice and data SLIC architectures are proposed to permit provisioning both the DSL and POTS hybrid functionality from a single linecard without the requirement for an expensive discrete component CO splitter. FIG. 4A illustrates the functional components of separate DSL and POTS linecards. FIG. 4B illustrates functional components of an integrated DSL and POTS linecard.

Referring to FIG. 4A, elements 442, 444, 446, and 448 form an xDSL modem for bi-directional communication of information between the subscriber line 490 and a digital services provider 412. xDSL digital signal processor 442 provides a digital downstream data signal received from the digital services provider to digital-to-analog converter (DAC) 446 that converts the digital data signal to analog form. DAC 446 provides the resulting analog signal to the xDSL transceiver 448. The analog downstream data signal from transceiver 448 is combined with the analog downstream voice signal onto the subscriber line using splitter 480.

Splitter 480 provides xDSL transceiver 448 with a subscriber line analog signal that has been filtered to eliminate voiceband spectral components resulting in an analog data signal including the analog upstream data signal. The upstream analog data signal is provided to an analog-to-digital converter (ADC) 444 that converts the analog information to digital form. ADC 444 provides the resulting digital signal to the xDSL digital signal processor (DSP) 442 for upstream communication to the digital services provider. xDSL transceiver 448 is responsible for both driving downstream data signals and receiving upstream data signals from the subscriber line. xDSL transceiver 448 performs the hybrid function of splitting the two-wire bi-directional communication path into an upstream path (xDSL transceiver, ADC, xDSL DSP) and a downstream path (xDSL DSP, DAC, xDSL transceiver). CO splitter 480 provides a high pass filter to prevent POTS related signals (e.g., analog voiceband signals, DC battery feed, ringing, etc.) from reaching the xDSL transceiver.

Given that the upstream and downstream xDSL communications share the same transmission line from the subscriber, the DSL linecard may include a cancellation function to eliminate the downstream DSL communications from the upstream path. This cancellation function may be performed within the transceiver itself or by another component such as xDSL DSP 442.

Voice digital signal processor 432 provides digital downstream information received from the voice digital services provider (e.g., PSTN 410) to a digital-to-analog converter (DAC) 436 that converts the digital voiceband signals to analog form. DAC 436 provides the resulting analog signal to the POTS transceiver 438 for downstream communication to the subscriber. POTS transceiver 438 receives analog information from the subscriber line and provides it to an analog-to-digital converter (ADC) 434 that converts the analog information to digital form. ADC 434 provides the resulting digital signal to voice DSP 432 for upstream communication to the PSTN 410.

POTS transceiver 438 is responsible for both driving downstream voiceband communications and receiving upstream voiceband communications from the subscriber line. POTS transceiver 438 performs the hybrid function of splitting the two-wire bidirectional communication path into an upstream path (POTS transceiver, ADC, voice DSP) and a downstream path (voice DSP, DAC, POTS transceiver). CO splitter 480 provides a low pass filter to prevent high frequency signals due to the xDSL communications on the subscriber line from reaching the POTS transceiver.

Given that the upstream and downstream voiceband communications share the same transmission line from the subscriber, the POTS linecard may include a cancellation function to eliminate the downstream voiceband communications from the upstream path. This cancellation function may be performed within the transceiver itself or by another component such as voice DSP 432.

The POTS transceiver may also be referred to as a subscriber line interface circuit (SLIC). Modem SLICs, however, may include additional functions. For symmetry with the xDSL functional blocks illustrated as DSL linecard 440, element 438 is referred to as a POTS transceiver.

FIG. 4B illustrates integration of POTS and xDSL services onto a single linecard 452. Broadband transceiver 450 provides the function of both the xDSL transceiver and the POTS transceiver. xDSL DSP 442 provides downstream digital information from a first digital service network (e.g., IP service provider) to DAC 446 which converts the digital information to analog form for downstream communications using broadband transceiver 450. Similarly, voice DSP 432 provides downstream digital information from a second digital service network (e.g., PSTN) to DAC 436 that converts the digital information to analog form for downstream communications using broadband transceiver 450.

Broadband transceiver 450 receives analog signals from the subscriber line. Broadband transceiver 450 separates the analog signals into an xDSL upstream data path (high frequency) and a POTS upstream voice path (low frequency). Analog information on the upstream data path is provided to ADC 444 that converts the analog information to digital form for upstream communications to the first digital network using xDSL DSP 442. Similarly, analog information on the voice path is provided to ADC 434 that converts the analog information to digital form for upstream communication to the second digital network using voice DSP 432.

The broadband transceiver may be embodied as one or more integrated circuits. Each proposed transceiver architecture provides for upstream and downstream voice paths and upstream and downstream data paths. In particular, each proposed architecture incorporates one of the upstream/downstream voice path and upstream/downstream data path onto the same integrated circuit.

Figure 5:
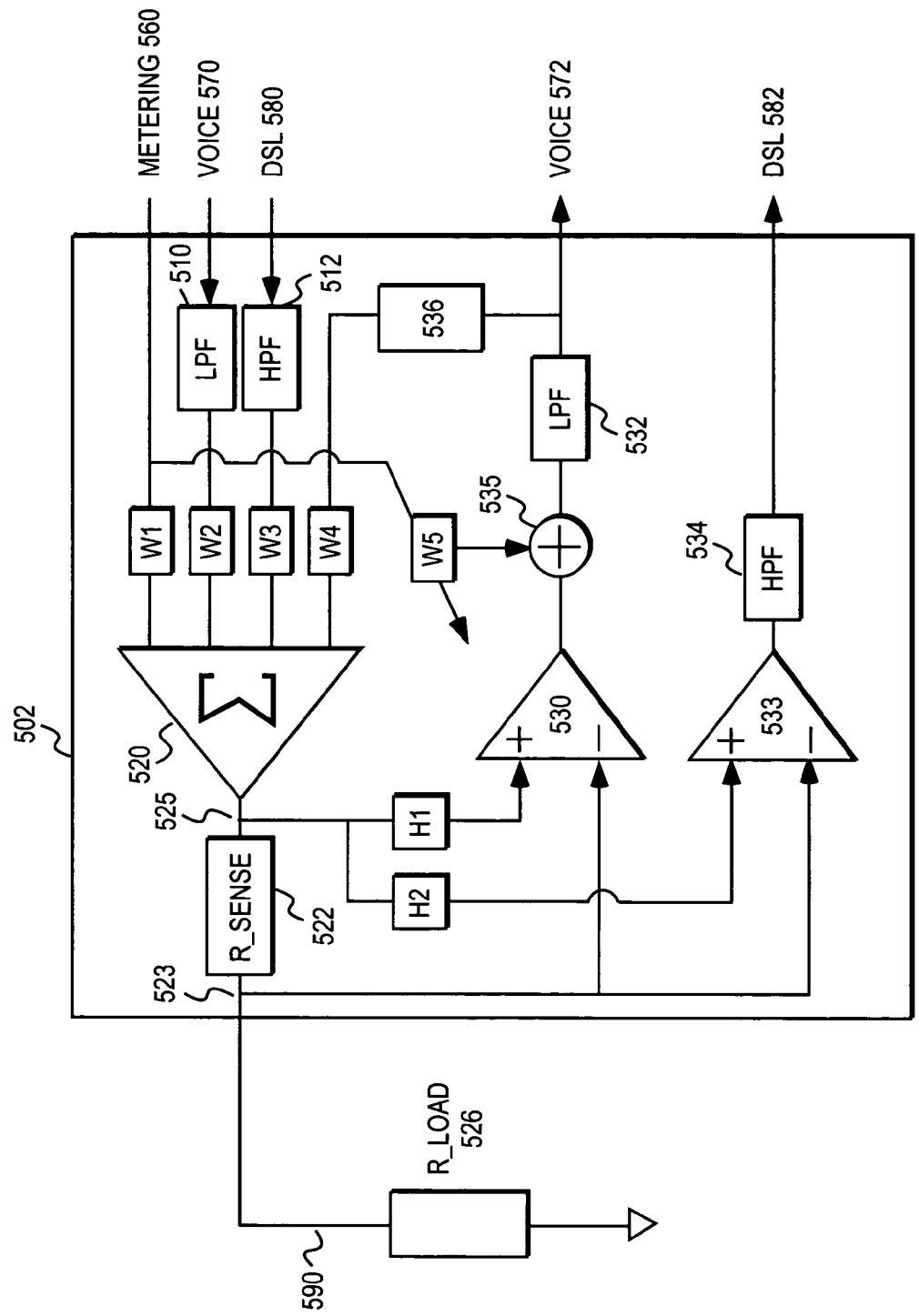
FIG. 5 illustrates one embodiment of an integrated digital and voice data transceiver architecture.

FIG. 5 illustrates one embodiment of a broadband transceiver wherein the POTS and DSL transceiver circuitry reside on the same integrated circuit die 502. Due to the symmetry of the transceiver circuitry, only single-ended circuitry is illustrated for clarity. Thus, in these examples, although the subscriber loop still requires a tip and a ring line, the differential signaling architecture is modeled as a single-sided source-to-ground architecture for clarity. Thus the illustrated subscriber line 590 comprises only one of the tip and ring lines because the other line is ground.

Integrated circuit die 502 provides for POTS functionality such as metering 560, downstream voice 570, and upstream voice 572. Integrated circuit die 502 also provides for DSL functionality including downstream DSL 580 and upstream DSL 582.

Metering 560 is used primarily for timing toll calls. In one embodiment, the metering signal is approximately a 15-volt peak-to-peak signal with a frequency of 12 kHz or 16 kHz. The voice signals 570, 572 are approximately 3 volts peak-to-peak. DSL signaling is approximately 34 volts peak-to-peak downstream and 14 volts peak-to-peak upstream. A DC supply of at least 48 volts is typically required to support the ringing function for long loops. The ringing signal may be 150 volts peak-to-peak.

Downstream driver 520 drives the subscriber equipment modeled as R_LOAD 526 with weighted versions of the analog metering signal 560, analog downstream voice signal 570, and analog downstream DSL signal 580. Downstream driver 520 is thus a summing amplifier. Weights W1-W4 control the relative weighting of the input signals to summing amplifier 520. Downstream driver 520 effectively superimposes the downstream metering, voice, and DSL signals on top of each other in proportions determined by the impedances of weights W1-W4.

In one embodiment, downstream low pass filter 510 is provided to ensure frequencies within the downstream voice signal 570 do not exceed the bandwidth allocated for voiceband communications. Similarly, high pass filter 512 is provided to ensure that downstream DSL signal 580 does not contain spectral components within the bandwidth allocated for voiceband communications.

In the illustrated embodiment, the hybrid function for separating the two-wire bidirectional communication path into a 2-wire downstream and a 2-wire upstream path (4-wire total) for each of the voice and data communications is performed in the same integrated circuit. Given that the upstream and downstream POTS communications share the same transmission line, any signals received from the subscriber line inherently include both the upstream signal communicated by the subscriber equipment and the downstream signal transmitted by driver 520. Accordingly, the downstream signal must be canceled or removed from the received signal to exclusively identify the upstream signal attributable to the subscriber equipment.

Referring to FIG. 4B, this cancellation function may be incorporated into the transceiver 438 or into a functional block further upstream such as voice DSP 432. The term "upstream" will be used to refer to both the upstream signal before and after the cancellation of any included downstream signal.

Integrated circuit die 502 includes receiver circuitry coupled to receive the analog signals on the subscriber line. The receiver circuitry includes upstream voice driver 530 associated with the upstream voice path and upstream data driver 533 associated with the upstream data path.

Each of drivers 530, 533 is coupled to receive the upstream analog signal from the subscriber line 590 (i.e., at node 523). Each upstream driver is also provided with the output of downstream driver 520 on the other side of R_SENSE 522 at node 525 to permit elimination of the downstream data or voice signals from the upstream signal using hybrid filters H2 and H1, respectively.

Upstream voice driver 530 is provided with the analog signal appearing on the subscriber line at node 523. At node 525, the output of the downstream driver 520 is coupled to the upstream voice driver through hybrid filter H1 to permit cancellation of the downstream voice signal from the received analog signal.

Metering cancellation circuitry (elements 535 and W5) is provided to remove the metering signal 560 from the upstream voice signal. In one embodiment, W5 is an adaptive finite impulse response (FIR) filter. Upstream low pass filter 532 eliminates substantially all of any high frequency components attributable to the DSL services from the upstream voice signal 572. Feedback element 536 and weight W4 provide a mechanism for voiceband impedance synthesis to meet POTS requirements.

The upstream DSL driver 533 is provided with the analog signal appearing on the subscriber line at node 523. At node 525, the output of the downstream driver 520 is coupled to the upstream DSL driver through hybrid filter H2 to permit cancellation of the downstream DSL signal from the received analog signal.

Upstream high pass filter 534 eliminates substantially all of any low frequency spectral components including the metering signal 560 attributable to voiceband communications. Although hybrid filter H1 eliminates some of the metering signal, the high pass filter 534 provides greater rejection of the metering signal in the upstream signal.

This architecture eliminates the use of an external central office splitter. Moreover, DSL and POTS functionality can be provided with the same line card. One disadvantage of the integrated voice and data (IVD) transceiver of FIG. 5, however, is the semiconductor fabrication process required for the manufacture of such an integrated circuit die 502. In particular, a high voltage process (~150 volts) is required. The number of semiconductor fabricators capable of manufacturing such an integrated circuit die is extremely limited at this time.

Figure 6A:
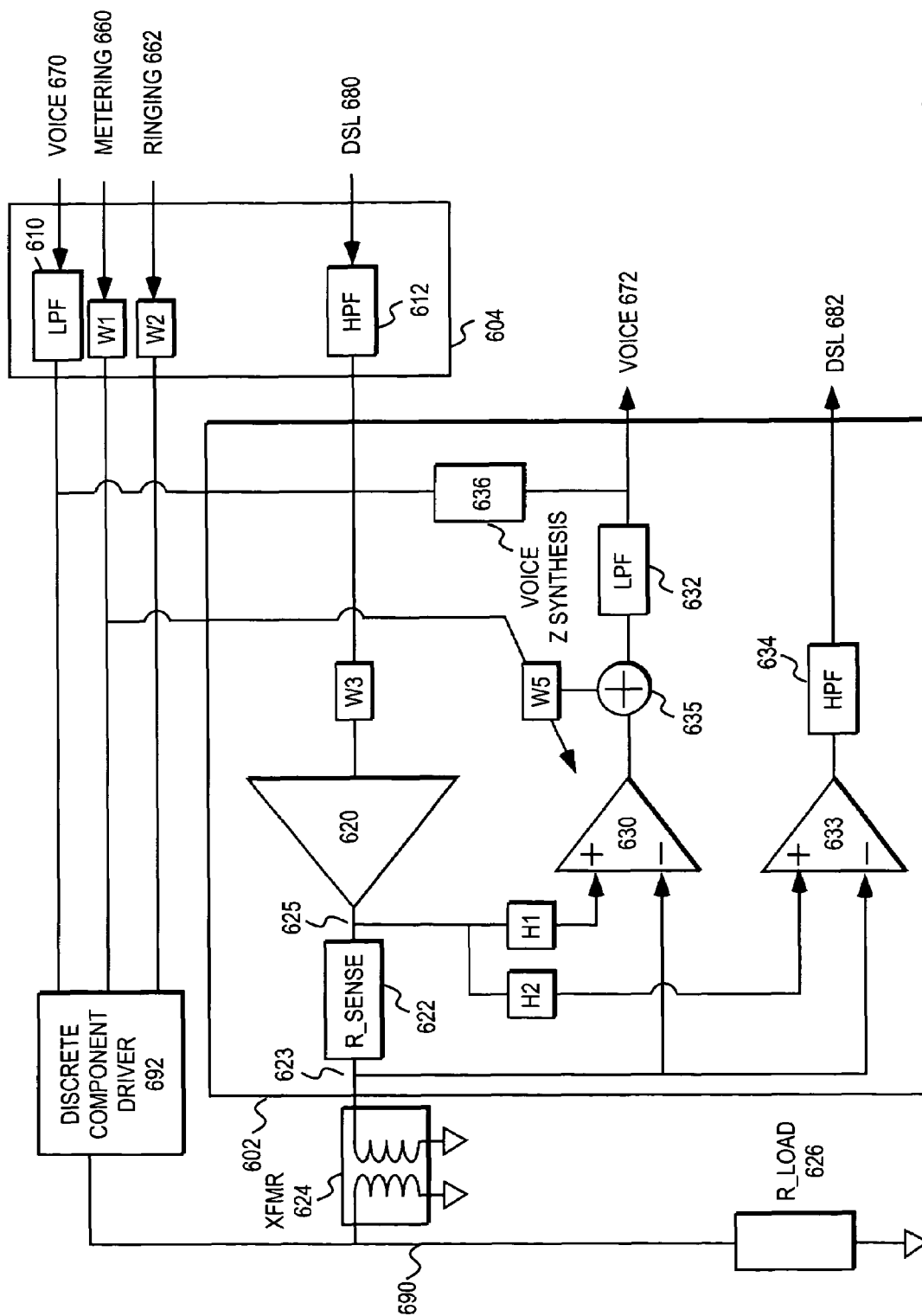
FIG. 6A illustrates an alternative embodiment of an integrated digital and voice transceiver architecture.

FIG. 6A illustrates an alternative integrated voice and data transceiver architecture. Transceiver circuitry for handling upstream and downstream communications is distributed across more than one integrated circuit die 602, 604. A few discrete components 692 are provided to permit the use of a low voltage integrated circuit die 604 for driving the downstream voice, metering, and ringing signals. The downstream high pass filter 612 for the downstream DSL signal 680 is included in the same integrated circuit die 604. In one embodiment, integrated circuit die 604 is fabricated with a low voltage process. The DSL driver is located on integrated circuit die 602. In one embodiment, integrated circuit die 602 is fabricated with a medium voltage process (~40 volts).

Discrete component driver 692 drives the downstream voice, metering, and ringing signals onto subscriber line 690. Downstream voice 670 passes through downstream low pass filter 610 before being provided to the discrete component driver 692 to ensure that the POTS voice signal does not introduce any high frequency signals that might disrupt the DSL communications. The metering signal 660 and ringing signal 662 are weighted by weights W1 and W2, respectively, before being provided to the discrete component driver 692. The DSL downstream signal 680 is provided to downstream driver 620 after weighting (W3) and downstream high pass filter 612. The output of driver 620 is coupled to the subscriber line 690 via transformer 624. Downstream low pass filter 610, weights W1, W2, and downstream high pass filter 612 are located on the same integrated circuit die 604.

The upstream DSL signal 682 is extracted by tapping and filtering the subscriber line 690 on the transceiver side of transformer 624 at 623. Upstream DSL driver 633 is also provided with the output of downstream driver 620 on the other side of R_SENSE 622 at node 625 to permit elimination of the downstream data or voice signals from the upstream signal using hybrid filter H2. Upstream high pass filter 634 eliminates the metering signal 660 and the low frequency spectral components associated with voiceband communications.

Upstream voice driver 630 senses the subscriber line across R_SENSE 622 to provide an upstream voice signal. Upstream voice driver 630 is also provided with the output of downstream driver 620 on the other side of R_SENSE 622 at node 625 to permit elimination of the downstream data or voice signals from the upstream signal using hybrid filters H1. Metering cancellation circuitry (elements 635, W5) is provided to at least remove the downstream metering signal from the upstream voice signal 672. In one embodiment, W5 is an adaptive finite impulse response (FIR) filter. Upstream low pass filter 632 eliminates substantially all the high frequency components attributable to the DSL services from the upstream voice signal 672. Feedback element 636 and weight W4 provide a mechanism for voiceband impedance synthesis to meet POTS requirements.

The transceiver components associated with the upstream signal paths for both data and voice signals are formed on the same integrated circuit die 602. Although the driver circuitry for the downstream data signal resides on integrated circuit die 602, the downstream high pass filter 612, weights W1, W2 associated with metering and ringing, and downstream low pass filter 610 reside on a distinct second integrated circuit die 604.

Figure 6B:
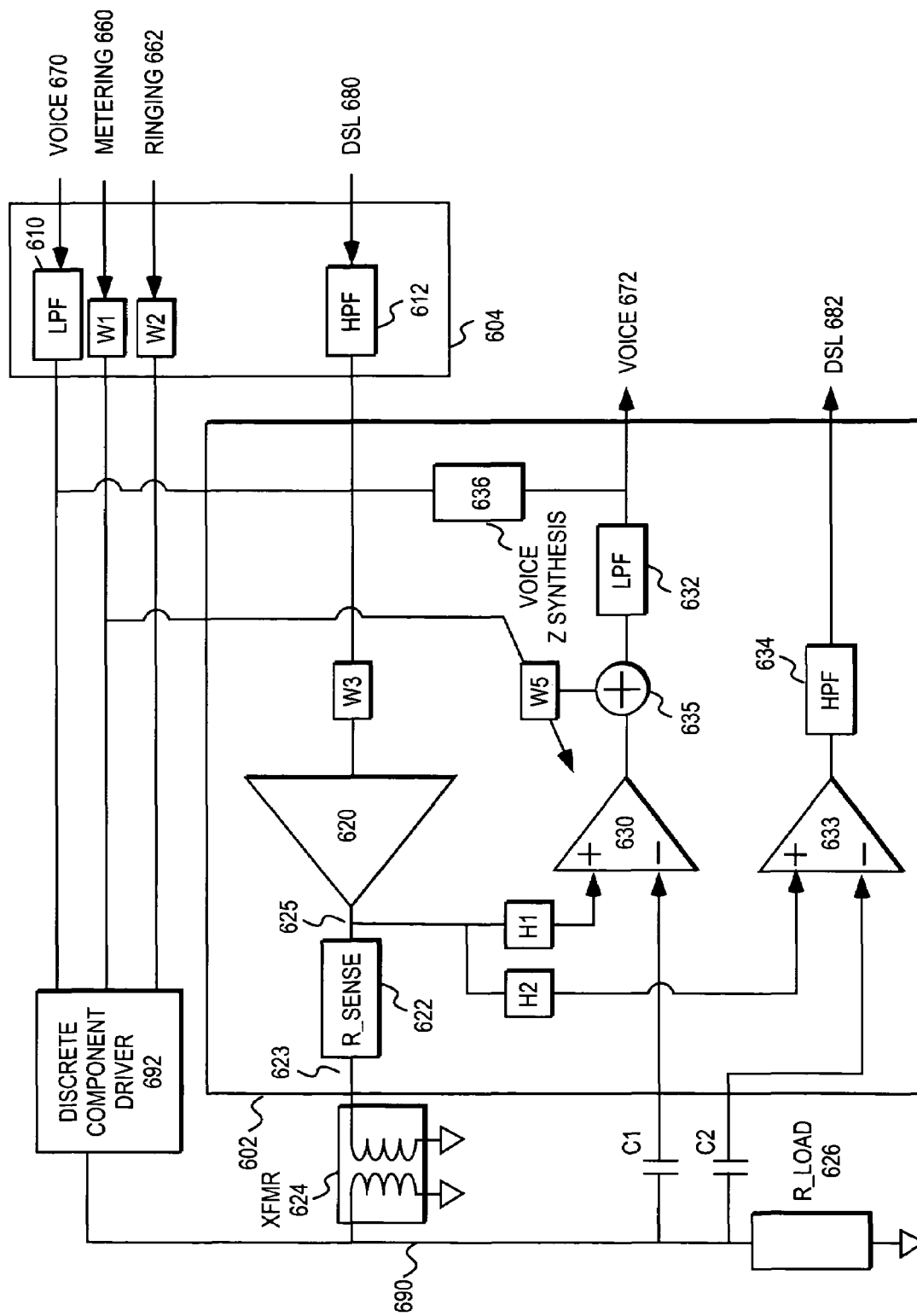
FIG. 6B illustrates one embodiment of an integrated digital and voice data transceiver architecture with capacitive bypass coupling for the receiver circuitry.

Transformers tend to have poor low frequency response. In various embodiments, the upstream voice, upstream DSL, or both are sensed from the subscriber line via a bypass capacitor. FIG. 6B illustrates one embodiment with bypass capacitors C1 and C2 for sensing the upstream voice and upstream DSL signals, respectively. In the illustrated embodiment, the upstream voice and upstream DSL signals are sensed on the subscriber line side of transformer 624 rather than at node 623. Capacitor C1 permits sensing the upstream DSL signal without degradation due to transformer 624. Capacitor C2 permits sensing the upstream DSL signal without degradation due to transformer 624. The remaining elements function as described with respect to FIG. 6A.

Figure 7A:
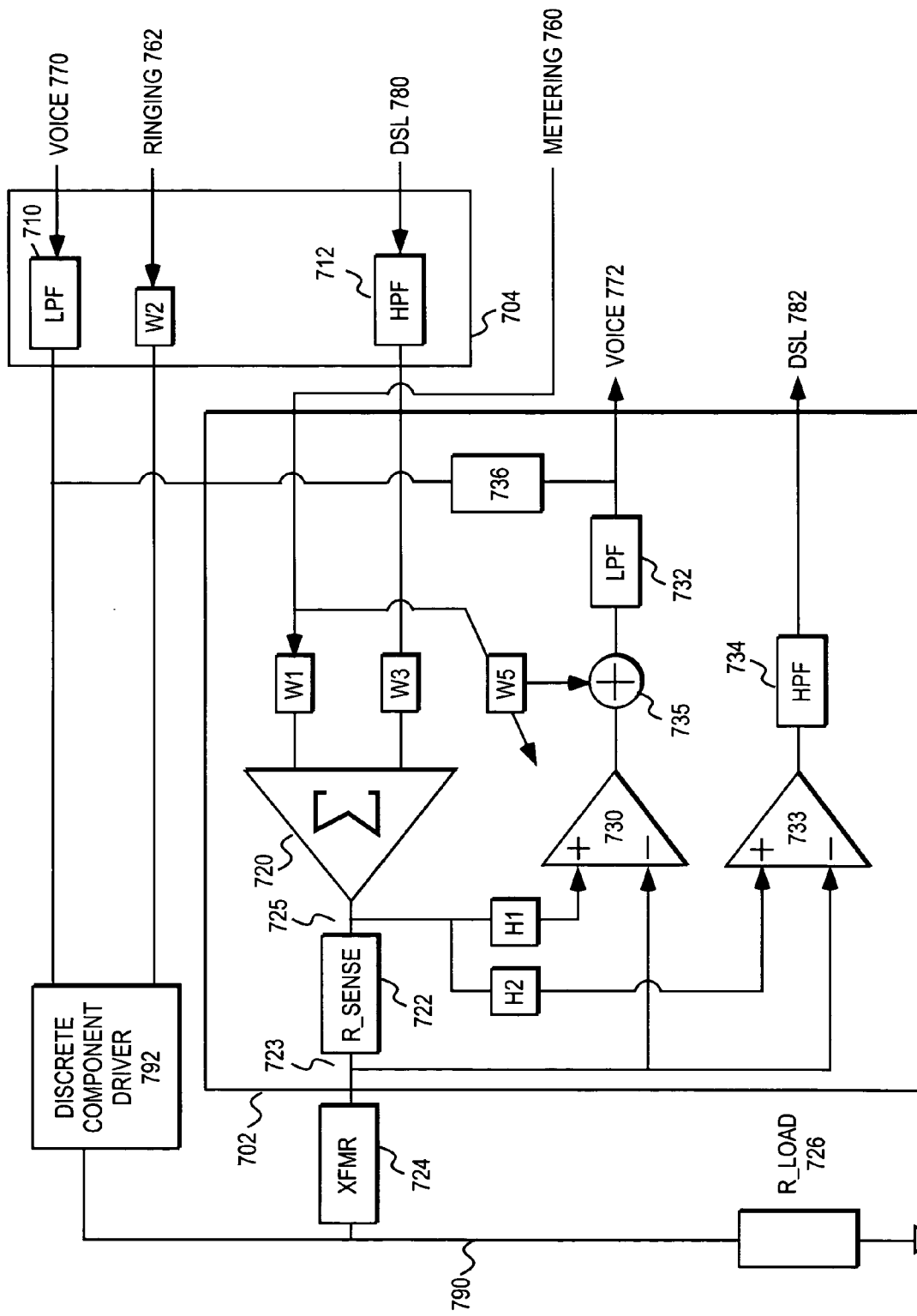
FIG. 7A illustrates an alternative embodiment of an integrated digital and voice transceiver architecture.

FIG. 7A illustrates an alternative integrated voice and data transceiver architecture. Transceiver circuitry for handling upstream and downstream communications is distributed across more than one integrated circuit die 702, 704. The transceiver components associated with the upstream signal paths for both data and voice signals are formed on the same integrated circuit die 702. Although the driver circuitry for the downstream data signal and metering signal resides on integrated circuit die 702, the downstream high pass filter 712 for the downstream DSL signal resides on integrated circuit die 704.

The primary distinction between the architecture of FIG. 6A and that illustrated in FIG. 7A is that the weighted metering signal 760 is provided to downstream driver 720 rather than discrete component driver 792. Weight W1 for the metering signal also resides within integrated circuit die 702 rather than integrated circuit die 704. As with the architecture of FIG. 6A, integrated circuit die 704 may be fabricated with a low voltage process. Integrated circuit die 702 may be fabricated with a medium voltage process (~40 volts).

Downstream driver 720 and discrete component driver 792 drive R_LOAD 726. The output of driver 720 is coupled to the subscriber line 790 via transformer 724. The discrete component driver 792 is directly coupled rather than transformer coupled to the subscriber line.

Discrete component driver 792 permits the use of a low voltage integrated circuit die 704 for driving the downstream voice signal and the ringing signal onto the subscriber line 790. Downstream low pass filter 710, weight W2 for the ringing signal, and downstream high pass filter 712 for the downstream DSL signal 780 are located on the same integrated circuit die 704. The downstream driver 720 for the metering signal 760 and the downstream DSL signal 780 are located on integrated circuit die 702.

The downstream voice signal 770 passes through downstream low pass filter 710 before being provided to the discrete component driver 792 to ensure that the POTS voice signal does not introduce any high frequency signals that might disrupt the DSL communications. The ringing signal 762 is weighted by weight W2 before being provided to the discrete component driver 792. The DSL downstream signal 780 is provided to downstream driver 720 after weighting (W3) and downstream high pass filter 712. The metering signal 760 is weighted by W1 before being provided to the downstream driver 720.

The upstream DSL signal 782 is extracted by tapping and filtering the subscriber line 790 on the transceiver side of transformer 724 at 723. Upstream DSL driver 733 is also provided with the output of downstream driver 720 on the other side of R_SENSE 722 at node 725 to permit elimination of the downstream data or voice signals from the upstream signal using hybrid filter H2. Upstream high pass filter 734 eliminates the metering signal 760 and the low frequency spectral components associated with voiceband communications.

Upstream voice driver 730 senses the subscriber line on the transceiver side of transformer 724 at 723. Upstream voice driver 730 is also provided with the output of downstream driver 720 on the other side of R_SENSE 722 at node 725 to permit elimination of the downstream data or voice signals using hybrid filter H1. In one embodiment, metering cancellation circuitry (elements 735, W5) is required to remove the remainder of any metering signal from the upstream voice signal 772. In one embodiment, W5 is an adaptive finite impulse response (FIR) filter. Upstream low pass filter 732 eliminates substantially all the high frequency components attributable to the DSL services from the upstream voice signal 772. Feedback element 736 and weight W4 provide a mechanism for voiceband impedance synthesis to meet POTS requirements.

Figure 7B:
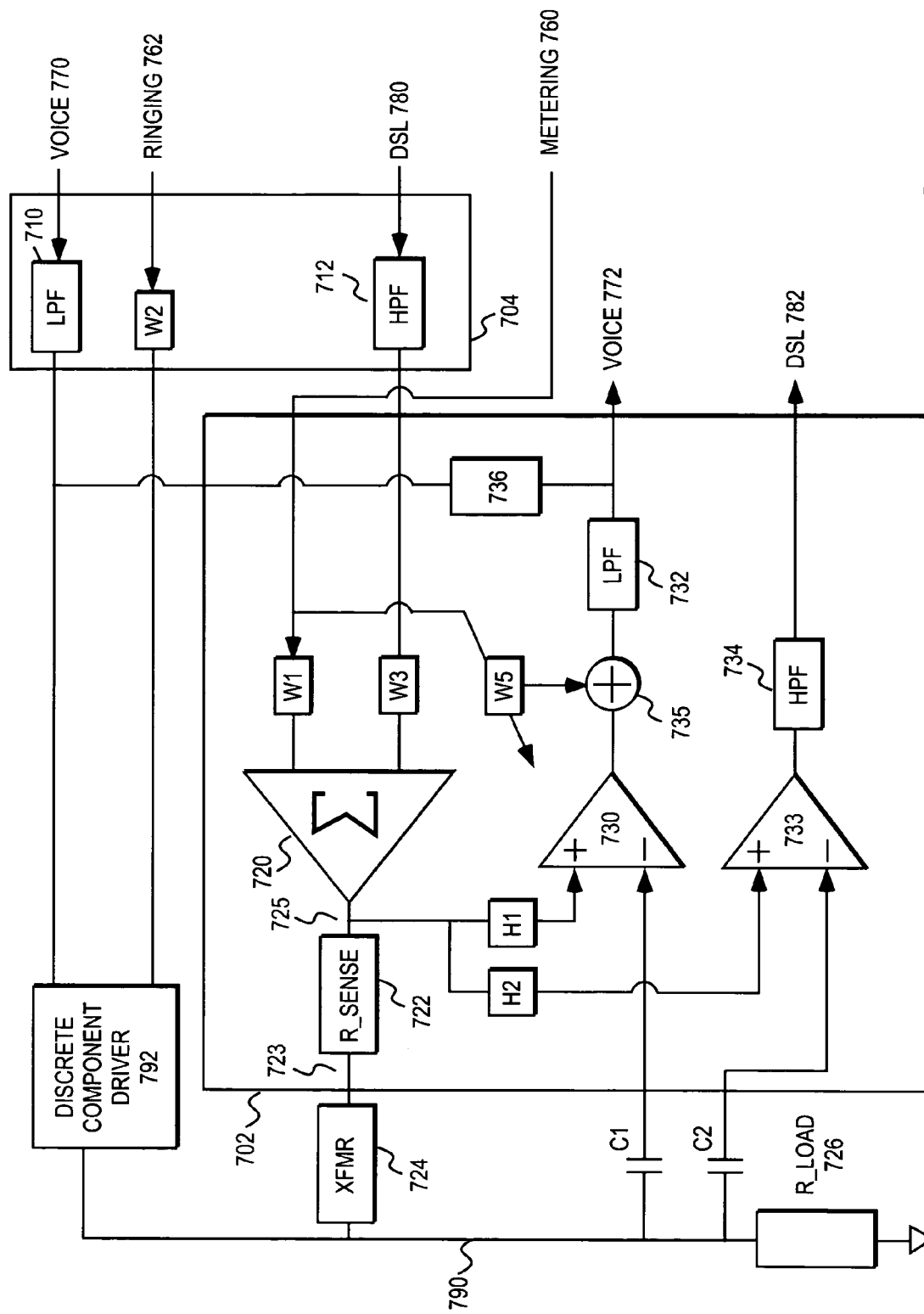
FIG. 7B illustrates one embodiment of an integrated digital and voice data transceiver architecture with capacitive bypass coupling for the receiver circuitry.

FIG. 7B illustrates an alternative embodiment with bypass capacitors C1 and C2 for sensing the upstream voice and the upstream DSL signals, respectively. In particular, the upstream voice and upstream DSL signals are sensed on the subscriber line side of transformer 724 rather than at node 723. Capacitor C1 permits sensing the upstream voice signal without degradation due to transformer 724. Capacitor C2 permits sensing the upstream DSL signal without degradation due to transformer 724. In various embodiments, only one of the upstream voice or upstream DSL signals is sensed from the subscriber line via a bypass capacitor. The remaining elements function as described with respect to FIG. 7A.

Figure 8:
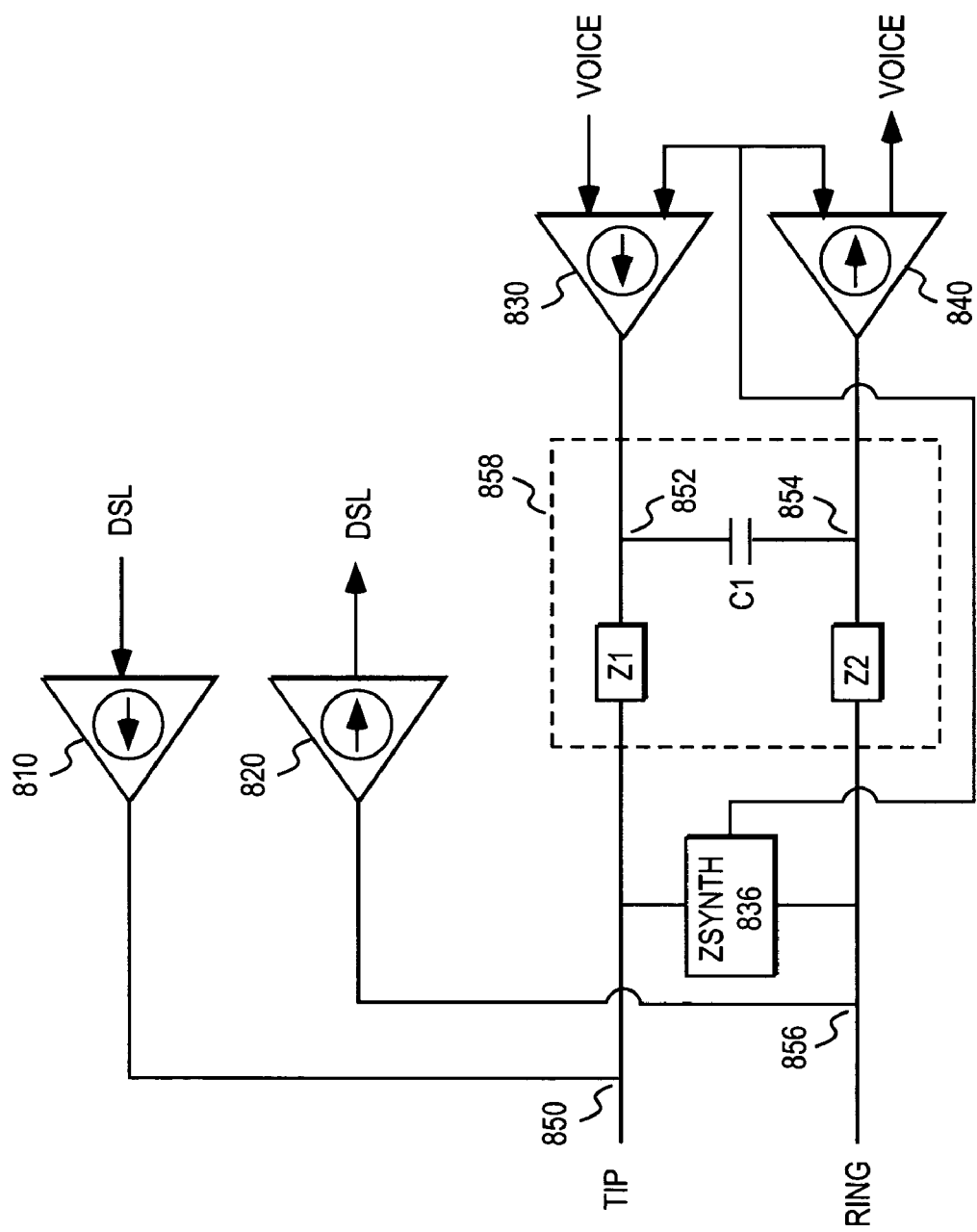
FIG. 8 illustrates one embodiment of a current driver for digital and voice transceiver.

DSL signaling is traditionally voltage driven in contrast with the current driven POTS model. FIG. 8, however, illustrates one embodiment of current-based driver circuitry for both DSL and voice downstream signals.

An impedance bridge 858 including Z1, Z2, and C1 is coupled to the subscriber line. A first pair of current drivers (830, 840) is coupled to the impedance bridge for driving a voice signal in a first frequency range onto the subscriber line. A second pair of current drivers (810, 820) is coupled to the impedance bridge for driving the DSL signal in a second frequency range onto the subscriber line.

Within the first frequency range, the impedance bridge couples the first pair of current drivers to the subscriber line through impedances Z1 and Z2. The output impedance of the first pair of current drivers is controlled by the Z synthesis feedback circuit 836 rather than Z1 or Z2. Within the second frequency range, the impedance bridge couples the second pair of current drivers to the subscriber line across an impedance of Z1+Z2.

In one embodiment, the impedance bridge comprises a first impedance Z1, a second impedance Z2, and a capacitor C1. A tip line and one of the second pair of current drivers is connected to a first terminal 850 of Z1. A first terminal of C1 and one of the first pair of current drivers is connected to a second terminal 852 of Z1. The other of the second pair of current drivers is connected to a first terminal 856 of Z2. The other of the first pair of current drivers and a second terminal of C1 are connected to a second terminal 854 of Z2. In one embodiment, impedances Z1, Z2 are in a range of 40-60 $\Omega$ with a nominal impedance of approximately 50 $\Omega$. Capacitor C1 has a value of approximately 5 nF.

Figure 9A:
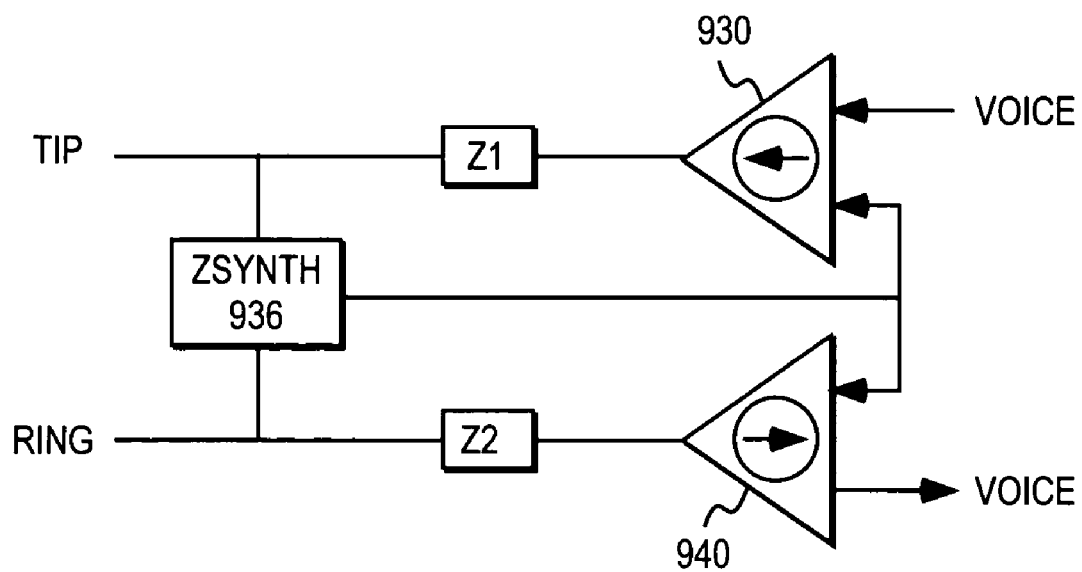
FIG. 9A illustrates the circuitry of FIG. 8 from the perspective of the voiceband driver.

Capacitor C1 behaves as an open circuit at low frequencies. Thus FIG. 9A illustrates driving the subscriber line at voiceband frequencies from the perspective of voiceband current drivers 930, 940. For longitudinal balance, impedances Z1 and Z2 are chosen to have substantially the same value. In one embodiment, Z1, Z2$\approx$50 $\Omega$. The Z synthesis feedback circuit 936 is used to control the output impedance of the first pair of current drivers.

Figure 9B:
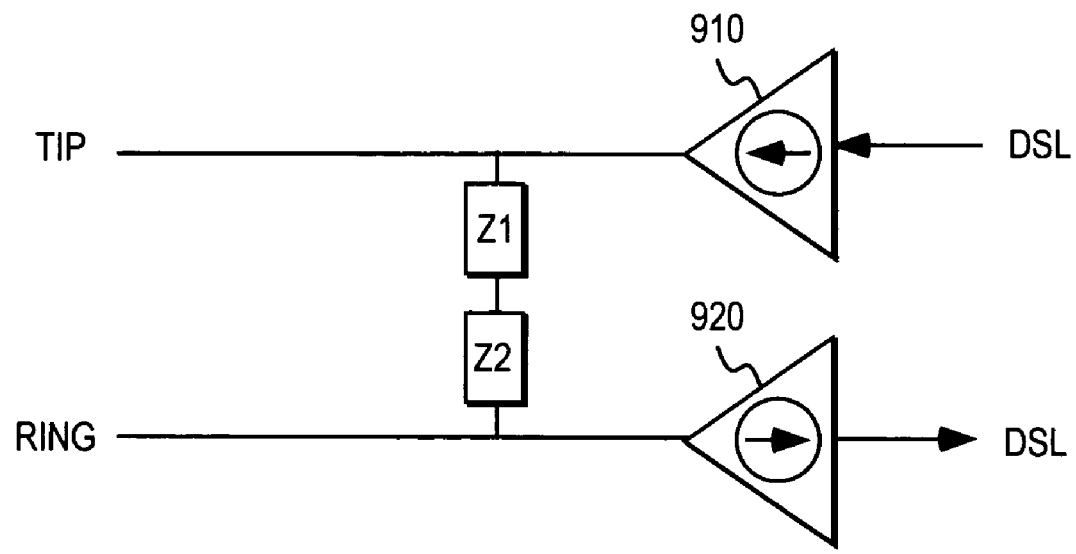
FIG. 9B illustrates the circuitry of FIG. 8 from the perspective of the DSL driver.

Capacitor C1 behaves as a short circuit at high frequencies. Thus FIG. 9B illustrates driving the subscriber line at xDSL frequencies from the perspective of DSL drivers 910 and 920. The Z synthesis feedback circuit affects only the output impedance of the voice drivers at low frequencies and does not significantly affect the output impedance for frequencies outside of the voiceband range. Impedances Z1, Z2 are effectively series-coupled from the DSL driver circuitry standpoint. Accordingly, the resulting impedance is Z1+Z2 or approximately 100 Ω for Z1, Z2≈50 Ω within the second frequency range associated with the xDSL communications.

Various subscriber line interface circuits having a transceiver integrating or at least partially integrating voice and data paths onto the same integrated circuit. In various embodiments an integrated circuit drives or receives a combination of the upstream/downstream voice and upstream/downstream data signals communicated on a subscriber line. Each combination includes a portion of at least one data path (upstream or downstream or both) and a portion of at least one voice path (upstream or downstream or both).

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A subscriber line interface circuit apparatus, comprising:
   a first driver for driving a downstream data signal in a non-voiceband range onto a subscriber line;
   a second driver for driving a downstream voice signal in a voiceband range onto the subscriber line, wherein the first and second drivers are distinct; and
   receiver circuitry coupled to provide an upstream data signal and an upstream voice signal from an upstream signal carried by the subscriber line, wherein the first driver and receiver circuitry reside on a same first integrated circuit die.

2. The apparatus of claim 1 further comprising:
   an upstream low pass filter providing a low pass filtered upstream signal as an upstream voice signal, wherein the upstream low pass filter resides on the first integrated circuit die.

3. The apparatus of claim 1 further comprising:
   a downstream low pass filter providing a low pass filtered downstream voice signal to the second driver, wherein the downstream low pass filter resides on a second integrated circuit die.

4. The apparatus of claim 1 wherein the voiceband range is from approximately 300 Hz to 4 kHz.

5. The apparatus of claim 1 further comprising:
   an upstream high pass filter providing a high pass filtered upstream signal as an upstream data signal, wherein the upstream high pass filter resides on the first integrated circuit die.

6. The apparatus of claim 1 further comprising:
   a downstream high pass filter providing a high pass filtered downstream data signal to the second driver, wherein the downstream high pass filter resides on a second integrated circuit die.

7. The apparatus of claim 1 wherein the second driver further drives a metering signal onto the subscriber line.

8. The apparatus of claim 7, further comprising:
   a metering signal cancellation circuit residing on the first integrated circuit die, wherein the metering signal cancellation circuit substantially cancels any metering signal present in the upstream voice signal.

9. The apparatus of claim 8 wherein the metering signal cancellation circuit further comprises a finite impulse response filter responsive to the metering signal provided to the second driver.

10. The apparatus of claim 7 wherein the downstream voice signal and the metering signal are weight coupled to the second driver wherein the weights permit varying the proportion of combination of the downstream voice and metering signals.

11. The apparatus of claim 1 wherein a lower bound of the non-voiceband range is greater than 16 kHz.

12. The apparatus of claim 1 wherein the downstream data signal is a discrete multi-tone encoded signal.

13. A subscriber line interface circuit apparatus, comprising:
    first driver circuitry for driving a downstream data signal onto a subscriber line;
    second driver circuitry for combining and driving a metering signal and a downstream voice signal onto the subscriber line; and
    receiver circuitry for receiving and separating an upstream signal from the subscriber line into an upstream voice signal and an upstream data signal, wherein the first driver circuitry and the receiver circuitry reside on a same first integrated circuit die exclusive of the second driver circuitry.

14. The apparatus of claim 13 wherein the voice signal resides in a voiceband range of approximately 300 Hz to 4 kHz.

15. The apparatus of claim 13 wherein the upstream and downstream data signals reside in a non-voiceband range greater than 25 kHz.

16. The apparatus of claim 13 wherein the upstream and downstream data signals are discrete multi-tone encoded data signals.

17. The apparatus of claim 13 further comprising:
    an upstream low pass filter providing a low pass filtered upstream signal as an upstream voice signal, wherein the upstream low pass filter resides on the first integrated circuit die.

18. The apparatus of claim 13 further comprising:
    a downstream low pass filter providing a low pass filtered downstream voice signal to the second driver circuitry, wherein the downstream low pass filter resides on a second integrated circuit die.

19. The apparatus of claim 13 further comprising:
    a metering signal cancellation circuit residing on the first integrated circuit die, wherein the metering signal cancellation circuit substantially cancels any metering signal present in the upstream voice signal.

20. The apparatus of claim 19 wherein the metering signal cancellation circuit further comprises a finite impulse response filter responsive to the metering signal provided to the first driver circuitry.

21. The apparatus of claim 13 wherein the receiver circuitry further comprises a first upstream driver coupled to receive the upstream signal.

22. The apparatus of claim 21 wherein the first upstream driver is capacitor-coupled to the subscriber line.

23. The apparatus of claim 21 wherein the first upstream driver is transformer-coupled to the subscriber line.

* * * * *